March 9, 1954 — E. G. MELROE — 2,671,554
TRAVELING HARVESTER CONVEYER
Filed Nov. 7, 1950
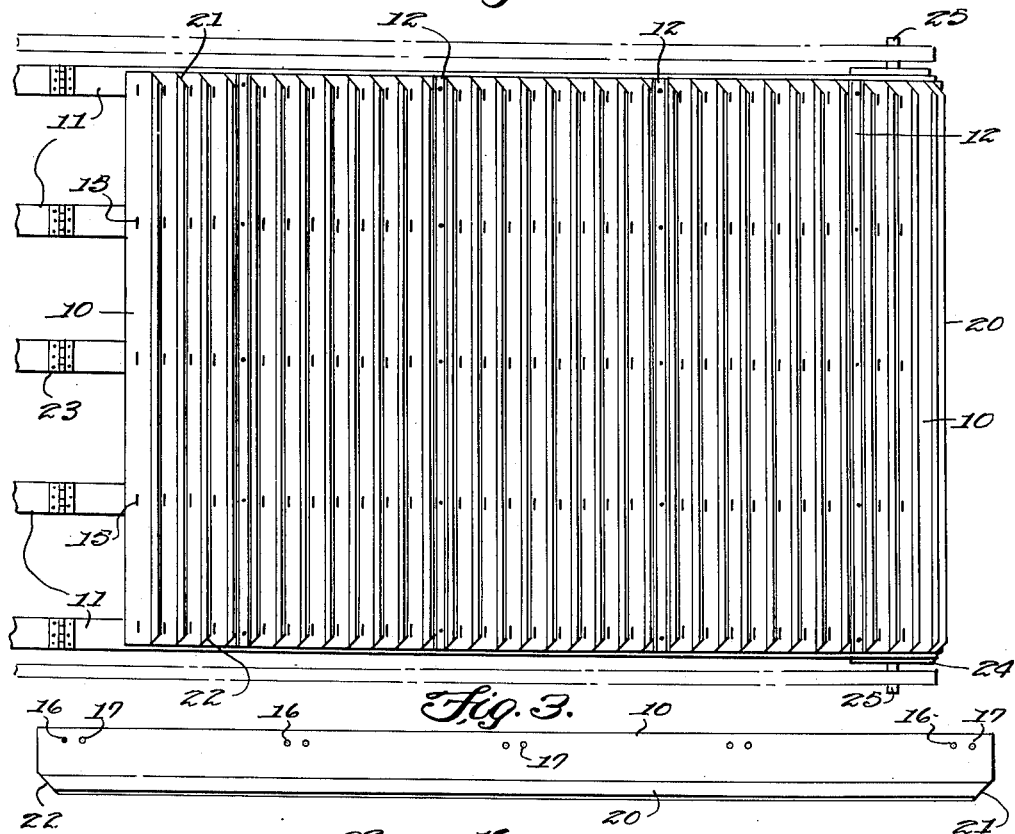
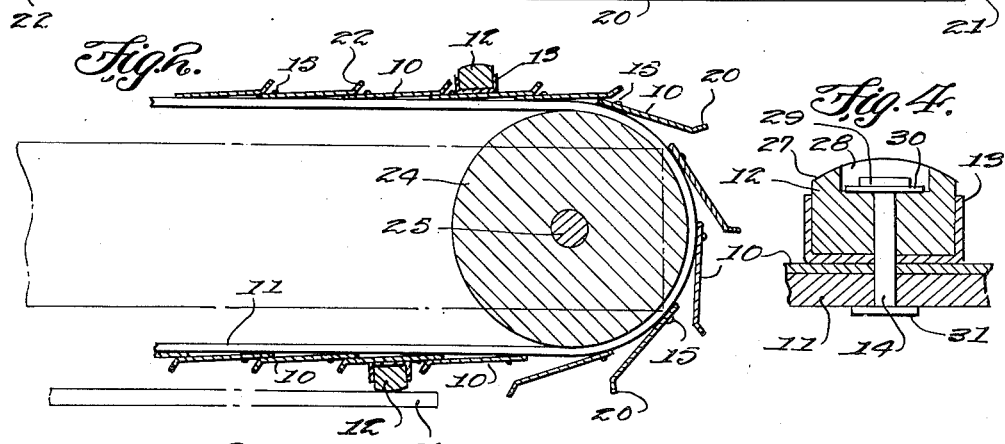
INVENTOR.
Edward G. Melroe,
BY Victor J. Evans & Co.
ATTORNEYS Patented Mar. 9, 1954

2,671,554

UNITED STATES PATENT OFFICE 2,671,554

TRAVELING HARVESTER CONVEYER

Edward G. Melroe, Gwinner, N. Dak.

Application November 7, 1950, Serial No. 194,495

1 Claim. (Cl. 198—197)

This invention relates to conveyors of the apron type used on harvesting machinery and equipment and in particular a conveyor having a plurality of transversely disposed slats with outwardly extended overlapping edges and with the slats carried by spaced belts, and in which transversely disposed strips are provided at spaced intervals throughout the length of the conveyor and carried by the slats for facilitating carrying products on the conveyor and also for spacing the lower section of the conveyor above a platform or other supporting means in the return travel thereof.

The purpose of this invention is to provide a harvesting conveyor having transversely disposed slats wherein the slats are formed to prevent grain winding around the roller at the idler end of the conveyor and also to provide means for suspending the lower or returning section of a conveyor above a supporting surface.

Various types of apron conveyors have been provided for harvesting machinery but it has been found difficult to use slat conveyors for grain, hay and the like because the material works in between the slats and for this reason canvas belts, which tear, and wear rapidly, are used universally. Conveyors of this type using metal slats have also been found objectionable because the weight of the metal slats causes the belt to drop downwardly on the lower side of the conveyor and where supporting means is provided the wearing surface wears rapidly. With this thought in mind this invention contemplates an improved type of conveyor wherein slats with upturned trailing edges are secured to spaced belts and the slats are supported at intervals by wood strips reinforced with U-shaped channels and bolted to the slats and belt.

The object of this invention is, therefore, to provide means for forming slats of a conveyor so that conveyors formed thereby may be used in harvesting grain without the grain working in between the slats.

Another object of the invention is to provide a harvesting conveyor having transversely disposed slats carried by belts in which reinforcing strips are provided at spaced intervals and in which the strips space the slats above a supporting platform in the return travel of the belt.

A further object of the invention is to provide a harvesting conveyor having transversely disposed slats with outwardly extended edges carried by spaced belts with reinforcing and spacing strips positioned on the slats which is of a simple and economical construction.

With these and other objects and advantages in view the invention embodies a conveyor including a plurality of spaced belts with the ends joined by hinges, with transversely disposed slats having outwardly extended trailing edges carried by the belts, and with reinforcing strips mounted in channels secured to the slats and belt and positioned at spaced intervals throughout the length of the conveyor.

Other features and advantages of the invention will appear from the following description taken in connection with the drawing wherein:

Figure 1 is a plan view of one end of the conveyor with parts broken away and with parts omitted.

Figure 2 is a longitudinal section through one end of the conveyor with the body of the conveyor broken away, showing one of the spacing strips supporting the returning section of the conveyor above a platform or the like.

Figure 3 is a detail showing the plan view of one of the slats with other parts omitted.

Figure 4 is a cross section through one of the reinforcing and spacing strips showing the strip mounted in a channel and secured to a slat and belt by a bolt or rivet.

Figure 5 is a detail showing a section through a connection between one of the slats and a belt showing a staple securing the slat to the belt.

Referring now to the drawing wherein like reference characters denote corresponding parts the improved conveyor of this invention includes a plurality of slats 10 carried by belts 11 and bars 12 reinforced with channels 13 and secured to the slats and belts by rivets 14.

In the design shown the slats 10 are secured to the belts 11 by staples 15, as shown in Fig. 5, the staples extending through openings 16 and 17 in the slat and the ends 18 and 19 thereof being crimped against the under surface of the belt.

The slats are formed with outwardly extended edges 20 and the ends are provided with beveled corners 21 and 22 as shown in Figs. 1 and 3.

The ends of the belts 11 are connected by hinges 23, as shown in Figure 1, or by other suitable means.

With the parts arranged in this manner the conveyors are mounted on pulleys 24 on shafts 25 and in the return movement of the lower section of the conveyor the slats and belts are supported above a platform or other supporting means as indicated by the numeral 26, by the strips 12.

As illustrated in Figure 4 the strips or bars are provided with arcuate outer surfaces 27 and the outer surfaces are provided with recesses 28 in which the rivet heads 29 and washers 30 are positioned. The opposite ends 31 of the rivets are positioned against the inner surfaces of the belts 11.

With the slats mounted in this manner the free edges extend outwardly, as illustrated in Figure 2 when the conveyor passes around the pulleys and by this means the grain is thrown outwardly away from the pulleys to prevent the grain etc. working in between the slats, belts and pulleys.

It will be understood that the slats may be formed of aluminum or other suitable material, and the bars or strips 12 may be formed of wood, or other suitable material.

The edges of the outside belts 11 extend beyond the ends of the slats, as shown in Figure 1, to prevent the ends of the slats catching and bending the said ends or to prevent tearing the slats from the belts. Conveyors of this type travel at high speed and it is necessary to protect the ends of the slats by spacing the ends from the edges of the belts in this manner.

It will be understood that modifications may be made in the design and arrangement of the parts without departing from the spirit of the invention.

What is claimed is:

A traveling harvester conveyor comprising a plurality of spaced parallel pulleys, endless belts trained over said pulleys, a plurality of slats extending transversely across the belts with the ends of the slats terminating at points spaced from outer edges of the belts at the outer sides of the conveyor, means including staples for attaching the slats to the belts at points spaced and adjacent from leading edges of the slats, the trailing edges of the slats resting upon leading edges of following slats and having flanges extending outwardly and angularly therefrom, the edges of the slats on which the flanges are positioned adapted to swing outwardly upon passage of the belts around pulleys at the ends of the conveyor, reinforcing channel members carried by certain of the slats, and bars carried by said channel shaped members, said bars being positioned in the channel members, each of said bars being provided with an arcuate outer surface having recesses therein, said channel members being secured in position with bolts extending successively through the recesses, channel members, slats and belts, each of said slats being provided with bevelled corners.

EDWARD G. MELROE.

References Cited in the file of this patent

UNITED STATES PATENTS

| Number | Name | Date |
|---|---|---|
| 627,274 | Selleck | June 20, 1899 |
| 704,823 | Gordon | July 15, 1902 |
| 1,151,218 | Schepmann | Aug. 24, 1915 |
| 1,181,018 | Lamb | Apr. 25, 1916 |
| 1,779,720 | Wood | Oct. 28, 1930 |
| 2,189,080 | Novak | Feb. 6, 1940 |